United States Patent
Yamasaki et al.

(10) Patent No.: US 8,931,002 B2
(45) Date of Patent: Jan. 6, 2015

(54) EXPLANATORY-DESCRIPTION ADDING APPARATUS, COMPUTER PROGRAM PRODUCT, AND EXPLANATORY-DESCRIPTION ADDING METHOD

(75) Inventors: Tomohiro Yamasaki, Kanagawa (JP); Hideki Tsutsui, Kanagawa (JP); Koji Urata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1812 days.

(21) Appl. No.: 12/049,767

(22) Filed: Mar. 17, 2008

(65) Prior Publication Data
US 2008/0240671 A1 Oct. 2, 2008

(30) Foreign Application Priority Data
Mar. 27, 2007 (JP) .................. 2007-082620

(51) Int. Cl.
 *H04N 7/025* (2006.01)
 *H04N 5/445* (2011.01)
 *G11B 27/11* (2006.01)
 *G06F 17/30* (2006.01)

(52) U.S. Cl.
 CPC .......... *G11B 27/11* (2013.01); *G06F 17/30817* (2013.01); *G06F 17/30796* (2013.01)
 USPC .................. 725/44; 725/37; 725/53

(58) Field of Classification Search
 CPC .. H04N 21/84; H04N 21/8405; H04N 21/845
 See application file for complete search history.

(56) References Cited

U.S. PATENT DOCUMENTS

| | | | |
|---|---|---|---|
| 7,739,601 B1* | 6/2010 | Wong et al. | 715/731 |
| 2006/0236338 A1* | 10/2006 | Shimoda | 725/37 |
| 2008/0086688 A1* | 4/2008 | Chandratillake et al. | 715/719 |
| 2008/0092168 A1* | 4/2008 | Logan et al. | 725/44 |
| 2010/0005070 A1* | 1/2010 | Moriya et al. | 707/3 |

FOREIGN PATENT DOCUMENTS

| | | |
|---|---|---|
| JP | 2001-5822 | 1/2001 |
| JP | 2004-364184 | 12/2004 |
| JP | 2006-157688 | 6/2006 |

OTHER PUBLICATIONS

Office Action issued by the Japanese Patent Office on May 26, 2009, for Japanese Patent Application No. 2007-082620, and Partial English Translation of Office Action.

* cited by examiner

*Primary Examiner* — Nasser Goodarzi
*Assistant Examiner* — Kyu Chae
(74) *Attorney, Agent, or Firm* — Finnegan, Henderson, Farabow, Garrett & Dunner, L.L.P.

(57) ABSTRACT

When a scene group including plural scenes, for example a group of scenes bookmarked during viewing of video contents is inputted, a combination of a scene and metadata in a group of metadata that represents characteristics of the scene, corresponding to the respective scenes in the scene group, which combination has a largest distance between the metadata, is selected as explanatory descriptions that are explanations for distinguishing among the scenes, and the selected explanatory descriptions for each scene included in the scene group is added to each scene.

9 Claims, 15 Drawing Sheets

FIG.4

| CONTENT IDENTIFIER | CONTENT TITLE | TYPE |
|---|---|---|
| M1 | ROMAN HOLIDAY | TV PROGRAM |
| M2 | VARIETY SHOW | TV PROGRAM |
| M3 | FRIENDS IN FOREST | TV PROGRAM |
| M4 | ROMAN HOLIDAY | DVD |
| ... | ... | ... |

| COMMENT IDENTIFIER | COMMENT STORING LOCATION IDENTIFIER | POSTER | POSTING DATE | TEXT |
|---|---|---|---|---|
| C1 | B1 | MR. A | 06/10/01 10:00 | UNDER THE SKIRT OF HER DRESS, SHE TAKES OFF HER SHOES AND IS SWINGING HER LEGS [M1, 00:04:38]. |
| C2 | B1 | MR. A | 06/10/01 11:00 | FAMOUS SCENE OF ANN AND JOE [M4, 01:13:35] RIDING DOUBLE ON VESPA AT FULL SPEED. |
| C3 | B2 | MS. B | 06/10/01 10:00 | IN THE SCENE OF THE BUS, THEY ARE ALL CROWING LIKE ROOSTERS [M2, 00:40:20]. |
| C4 | B3 | MR. C | 06/10/02 13:00 | I SELECTED EMOTIONAL SCENES [M1, 00:08:56] [M3, 00:37:54] [M3, 01:53:55]. |
| ... | ... | ... | ... | ... |

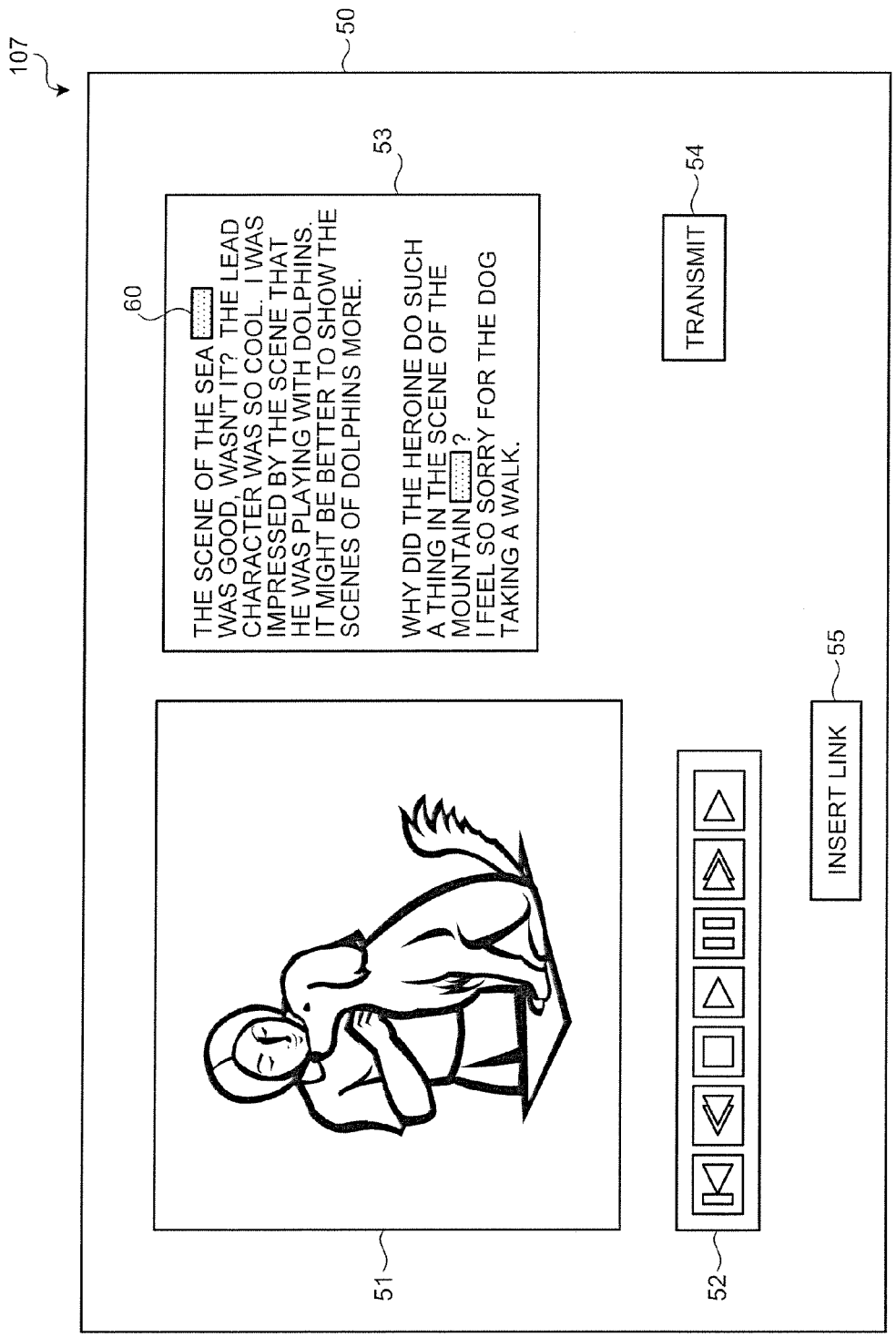

<scenelink content_id=1234 maintime=15000 intime=12000 outtime=20000>

601   602   603   604

| COMMENT STORING LOCATION IDENTIFIER | TITLE | URL |
|---|---|---|
| B1 | BULLETIN BOARD P | http://ppp.ppp.ppp.ppp/ |
| B2 | BULLETIN BOARD Q | http://qqq.qqq.qqq.qqq/qqq/ |
| B3 | BLOG R | http://rrr.rrr.rrr.rrr/ |
| ... | ... | ... |

| SCENE IDENTIFIER | WORD | APPEARANCE FREQUENCY | WORD CLASS | WORD WEIGHT |
|---|---|---|---|---|
| S1 | ANN | 10 | NOUN, PERSON | 5.0 |
|  | SHOES | 2 | NOUN, OBJECT | 3.5 |
|  | TAKE OFF | 3 | VERB | 1.1 |
| S2 | ANN | 5 | NOUN, PERSON | 4.3 |
|  | JOE | 15 | NOUN, PERSON | 3.2 |
| S3 | ANN | 8 | NOUN, PERSON | 4.0 |
|  | LEG | 7 | NOUN, OBJECT | 2.8 |
|  | PLAY | 4 | VERB | 5.0 |

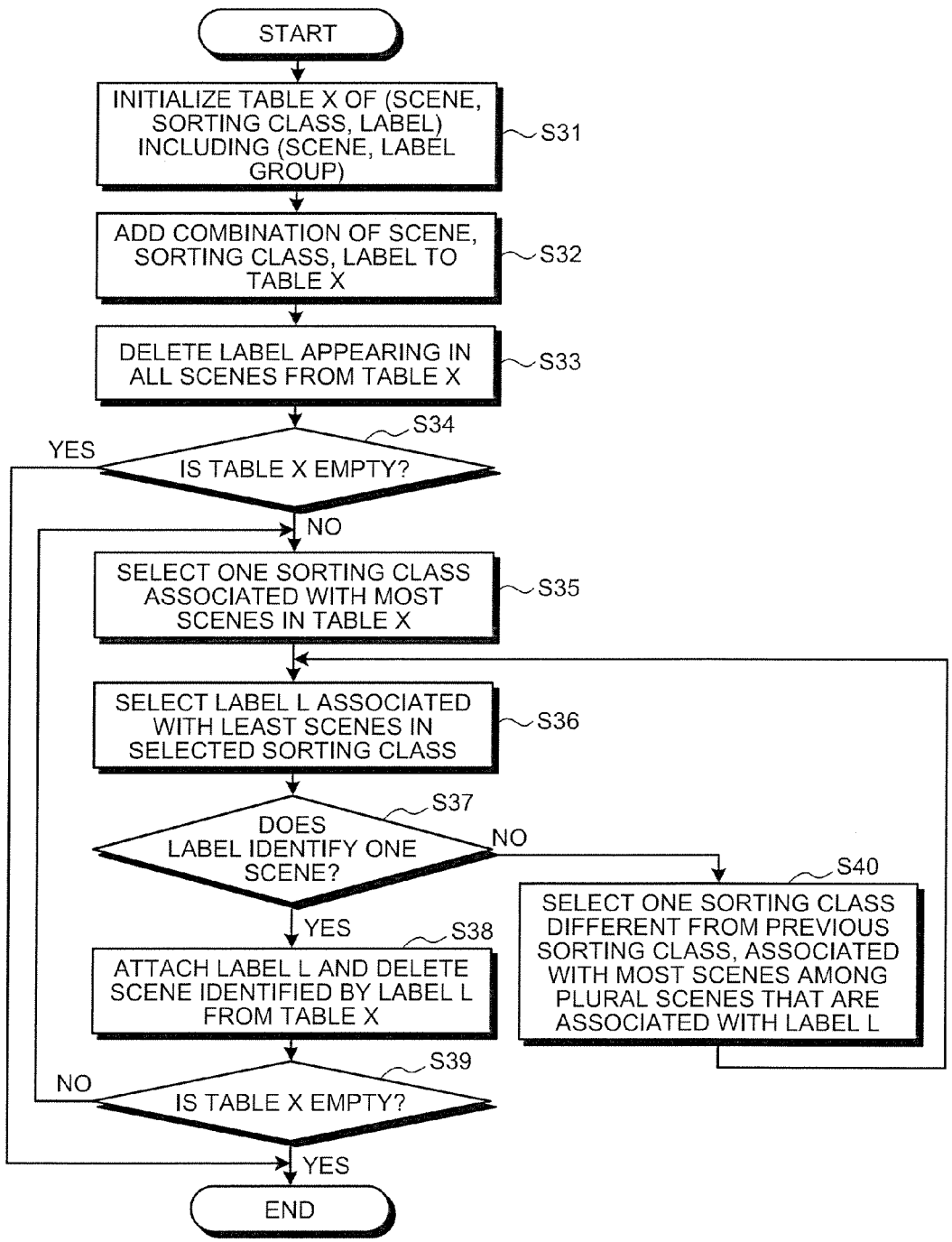

FIG.17

| SCENE | CLASSIFICATION CLASS | LABEL |
|---|---|---|
| [M2, 00:35:00] | BACKGROUND | BACKGROUND 2 |
| | PERSON | PERSON 1 |
| | PLACE | PLACE 1 |
| [M2, 01:10:00] | BACKGROUND | BACKGROUND 2 |
| | PERSON | PERSON 1 |
| | | PERSON 3 |
| | | PERSON 4 |
| | PLACE | PLACE 2 |
| | OBJECT | OBJECT 2 |
| [M2, 01:40:00] | BACKGROUND | BACKGROUND 3 |
| | PERSON | PERSON 4 |
| | PLACE | PLACE 3 |

FIG.18

COMMENT

AUDREY HEPBURN IN "ROMAN HOLIDAY" FASCINATED THE WORLD AND SHE WAS CALLED "WORLD'S LOVE" OR "FAIRY OF THE CENTURY" ▓▓ .THE SMILE OF PRINCESS ANN TWINGES MY HEART ▓▓ ▓▓ ▓▓ .

BECAUSE IT IS APPARENT THAT LABELS OF "PRINCESS ANN" AND "SMILE" ARE ATTACHED TO THESE SCENES, THESE LABELS ARE DELETED FROM TABLE X AND NOT USED AS EXPLANATORY DESCRIPTIONS.

FIG.24

| TIME | CLOSED CAPTION |
|---|---|
| ... | ... |
| 01:18:00 | COME WITH ME. |
| | THE MOUTH OF TRUTH. THE LEGEND IS THAT IF YOU'RE GIVEN TO LYING AND YOU PUT YOUR HAND IN THERE, IT'LL BE BITTEN OFF. |
| | WHAT A HORRID IDEA. |
| | LET'S SEE YOU DO IT. |
| 01:19:00 | (PRINCESS ANN TENTATIVELY PUTS HER HAND TOWARDS THE MOUTH OF TRUTH.) |
| ... | ... |

EXPLANATORY-DESCRIPTION ADDING APPARATUS, COMPUTER PROGRAM PRODUCT, AND EXPLANATORY-DESCRIPTION ADDING METHOD

CROSS-REFERENCE TO RELATED APPLICATIONS

This application is based upon and claims the benefit of priority from the prior Japanese Patent Application No. 2007-82620, filed on Mar. 27, 2007; the entire contents of which are incorporated herein by reference.

BACKGROUND OF THE INVENTION

1. Field of the Invention

The present invention relates to an explanatory-description adding apparatus, a computer program product, and an explanatory-description adding method.

2. Description of the Related Art

Recently, many methods of writing texts (annotations) such as impressions and opinions on video contents in television (TV) programs or digital versatile disks (DVD) as comment information and publicizing the comment information through a network using functions of blogging or bulletin boards are adopted. When the comment information such as impressions and opinions on video contents is publicized to many people using the function of blogging or bulletin boards, the user can communicate with many people via the comment information while viewing the video contents.

However, when writing the comment information as texts, the user in many cases writes texts on a scene that attracts his or her interests while the video contents are playing. In such cases, the user misses the next scene while writing texts, or cannot be concentrated on the video contents when the user pauses the video contents each time the user writes the texts.

Thus, to write the comment information as texts, the user simply bookmarks a scene that attracts his/her interests during viewing of the video contents, and writes comment information (texts) using the bookmark after viewing of the video contents is finished.

Meanwhile, a method of embedding a link to a scene in video contents into the comment information on the video contents to clearly inform the viewers of about which scene the comments concern is also used (for example, see JP-A 2004-364184 (KOKAI)). According to this technique, texts on a scene are displayed together with playing video. Therefore, while viewing video contents, the viewers can see the texts such as impressions and opinions on the scene that is viewed.

When texts such as impressions and opinions on the video contents are written using a bookmark after viewing of the video contents and when only time information is presented as the bookmark, the user has a low probability of determining a scene indicated by the bookmark (time information). When a thumbnail image as well as the time information is presented as a bookmark, the probability of determining a scene indicated by the bookmark (time information and the thumbnail image) becomes higher. In this case, when the thumbnail image is an image including a characteristic person or background, the determination can be easily made. However, since the thumbnail image is not always a discriminative image, the scene indicated by the bookmark (the time information and the thumbnail image) cannot be determined in some cases. When the scene indicated by the bookmark (the time information and the thumbnail image) cannot be determined, the user must check each bookmark to find a desired scene, which decreases convenience.

When a link to a scene in video contents is embedded into the comment information as described in JP-A 2004-364184 (KOKAI), the user can find details of the scene only by visiting the link. Therefore, in many cases, no description on the linked scene is given. Accordingly, when other users read the texts such as impressions or opinions on the video contents, these users cannot understand easily which scene the link represents at a glance.

SUMMARY OF THE INVENTION

According to one aspect of the present invention, an explanatory-description adding apparatus includes a storage unit that stores scene metadata as combinations of a scene at a certain time in video contents and a group of metadata representing characteristics of the scene; an input unit that input a scene group including a plurality of the scenes; a retrieving unit that retrieves a group of metadata corresponding to the respective scenes included in the scene group, from the scene metadata; and an adding unit that selects combinations of the metadata in which a distance among the metadata included in the group of metadata is maximum, as explanatory descriptions for distinguishing the respective scenes, and adds the combination of the metadata to the distinguished respective scenes.

According to another aspect of the present invention, an explanatory-description adding method includes storing scene metadata as combinations of a scene at a certain time in video contents and a group of metadata representing characteristics of the scene, in a storage unit; inputting a scene group including a plurality of the scenes that are received through an input unit; retrieving a group of metadata corresponding to the respective scenes included in the scene group, from the scene metadata stored in the storage unit; and selecting combinations of the metadata in which a distance among the metadata included in the group of metadata is maximum, as explanatory descriptions for distinguishing the respective scenes, and adding the combination of the metadata to the distinguished respective scenes.

A computer program product according to still another aspect of the present invention causes a computer to perform the method according to the present invention.

BRIEF DESCRIPTION OF THE DRAWINGS

FIG. 4 is a schematic diagram illustrating a data configuration of content information;

FIG. 5 is a schematic diagram illustrating a data configuration of comment information;

FIG. 6 is a front view of a writing user interface;

FIG. 16 is a flowchart of a scene labeling process;

FIG. 17 is a schematic diagram illustrating an example of a table;

FIG. 18 is a schematic diagram for explaining a case that descriptions on a scene link are included in comments;

FIG. 24 is a schematic diagram illustrating a data configuration of closed caption information.

DETAILED DESCRIPTION OF THE INVENTION

A first embodiment of the present invention is explained below with reference to FIGS. 1 to 22.

Figure 1:
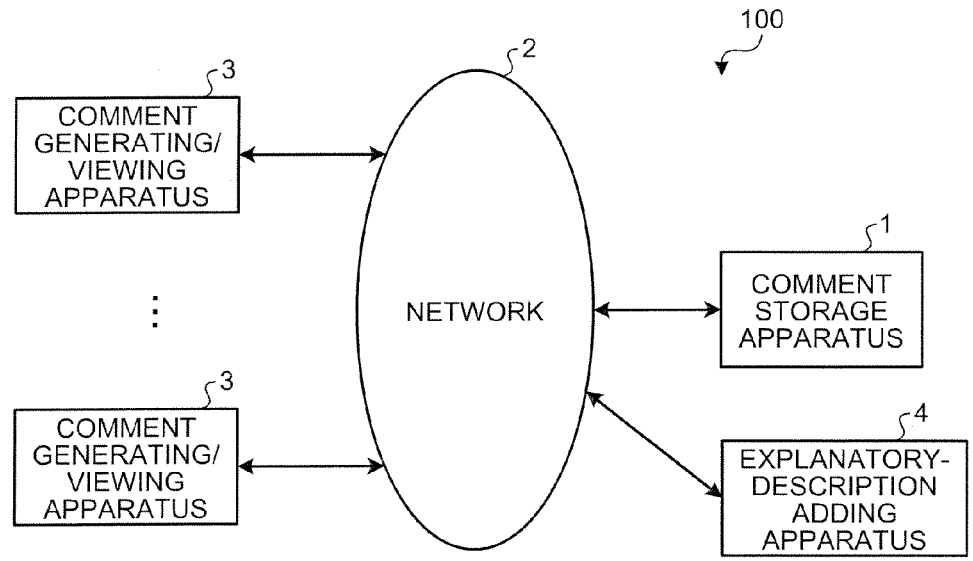
FIG. 1 is a schematic diagram illustrating architecture of a comment viewing system according to a first embodiment of the present invention.

FIG. 1 is a schematic diagram illustrating architecture of a comment viewing system 100 according to the first embodiment. The comment viewing system 100 is used to share comments having links to video contents. As shown in FIG. 1, a server client system is assumed as the comment viewing system 100, in which plural comment generating/viewing apparatuses 3 that are client computers used by users to write comments having links to video contents are connected to a comment storage apparatus 1 that is a server computer storing comments having links to video contents to be shared among the users, through a network 2 such as the Internet using an internet protocol (IP). In the first embodiment, an explanatory-description adding apparatus 4 that provides a function of adding explanatory descriptions to scenes that are bookmarked by the users in writing comments is further connected to the network 2.

The comment storage apparatus 1, the comment generating/viewing apparatus 3, and the explanatory-description adding apparatus 4 are for example common personal computers. While more comment storage apparatuses 1 and comment generating/viewing apparatuses 3 are provided in practice, FIG. 1 depicts one comment storage apparatus 1 and two comment generating/viewing apparatuses 3 to simplify the explanation. The comment storage apparatus 1 can be implemented as a bulletin board server or a blog server on the Internet.

Figure 2:
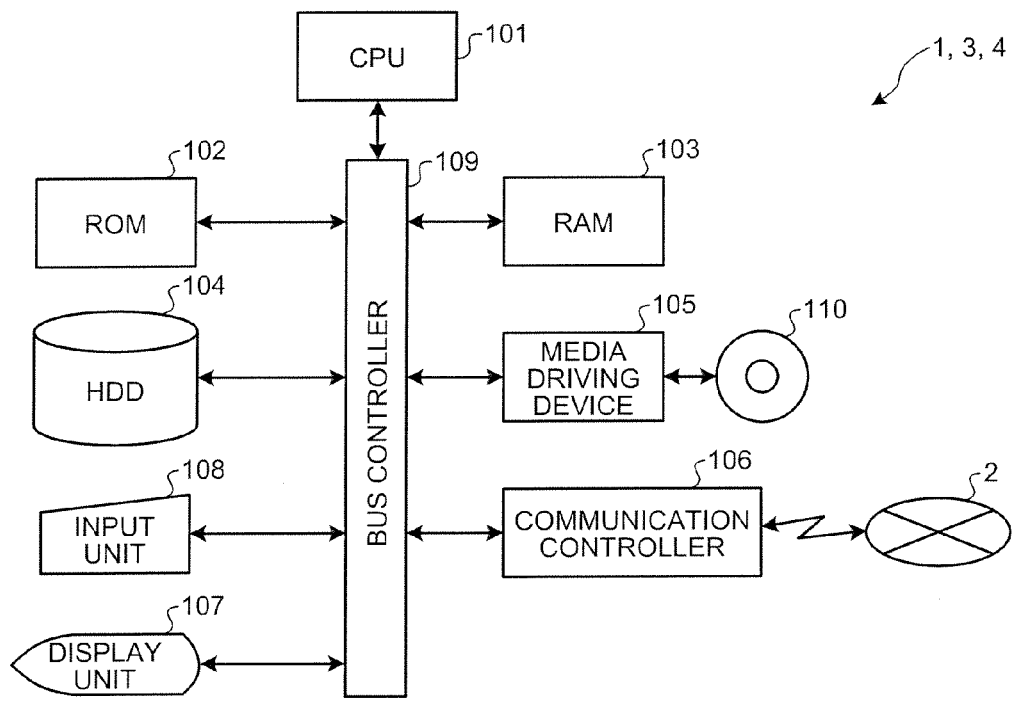
FIG. 2 is a module configuration diagram illustrating each apparatus that configures the system.

FIG. 2 is a module configuration diagram illustrating each apparatus that configures the comment viewing system 100. Each of the comment storage apparatus 1, the comment generating/viewing apparatus 3, and the explanatory-description adding apparatus 4 includes a central processing unit (CPU) 101 that performs information processing, a read only memory (ROM) 102 that contains a basic input/output system (BIOS) and the like, a random access memory (RAM) 103 that stores various data in a rewritable manner, a hard disk drive (HDD) 104 that serves as various databases and stores various programs, a media driving device 105 such as a DVD drive for holding information, distributing information to outside, and receiving information from outside, using a storage medium 110, a communication controller 106 that transmits information via communication with external other computers through the network 2, a display unit 107 such as a cathode ray tube (CRT) and a liquid crystal display (LCD) that displays a progress or result of processing to an operator, and an input unit 108 that is a pointing device such as a keyboard and a mouse for inputting a command or information to the CPU 101 by the operator. A bus controller 109 arbitrates data that are transmitted and received among these components, to operate the comment storage apparatus 1, the comment generating/viewing apparatus 3, and the explanatory-description adding apparatus 4.

In the comment storage apparatus 1, the comment generating/viewing apparatus 3, or the explanatory-description adding apparatus 4, when the operator turns on power, the CPU 101 starts a program called "loader" in the ROM 102, loads an operating system (OS), i.e., a program for managing hardware and software in the computer, from the HDD 104 into the RAM 103, and starts the OS. The OS starts programs, and loads or saves information according to operations by the operator. As typical OSs, Windows (registered trademark) and UNIX (registered trademark) are known. An operating program running on the OS is called "application program". The application program is not limited to one running on a predetermine OS but can be one that makes an OS perform part of various processing as described below. Alternatively, the application program can be one provided as part of a group of program files that configures given application software or OS.

The comment storage apparatus 1 stores a comment storing program in the HDD 104 as the application program. In this sense, the HDD 104 serves as a storage medium that stores the comment storing program.

The comment generating/viewing apparatus 3 stores a comment generating and viewing program in the HDD 104 as the application program. In this sense, the HDD 104 serves as a storage medium that stores the comment generating and viewing program.

The explanatory-description adding apparatus 4 stores an explanatory-description adding program in the HDD 104 as the application program. In this sense, the HDD 104 serves as a storage medium that stores the explanatory-description adding program.

Generally, the application program installed in the HDD 104 of the comment storage apparatus 1, the comment generating/viewing apparatus 3, and the explanatory-description adding apparatus 4 is recorded on the storage medium 110 such as various optical disks including a compact disk read only memory (CD-ROM) and a DVD, various magneto optical disks, various magnet disks including a flexible disk (FD), various types of media including a semiconductor memory. The operating program recorded on the storage medium 110 is installed in the HDD 104. The storage medium 110 having portability, such as an optical information recording medium including a CD-ROM and a magnetic medium including an FD can be also used for the storage medium that stores the application program. The application program can be loaded from outside for example through the communication controller 106 and installed in the HDD 104.

In the comment storage apparatus 1, when the comment storing program running on the OS is started, the CPU 101 carries out various operations based on the comment storing program, and concentratively controls the respective components. In the comment generating/viewing apparatus 3, when the comment generating and viewing program running on the OS is started, the CPU 101 carries out various operations based on the comment generating and viewing program and concentratively controls the respective components. In the explanatory-description adding apparatus 4, when the explanatory-description adding program running on the OS is started, the CPU 101 carries out various operations based on the explanatory description adding program and concentratively controls the respective components. Among the various operations carried out by the CPU 101 of the comment storage apparatus 1, the comment generating/viewing apparatus 3, and the explanatory-description adding apparatus 4, characteristic processes of the first embodiment are explained below.

Figure 3:
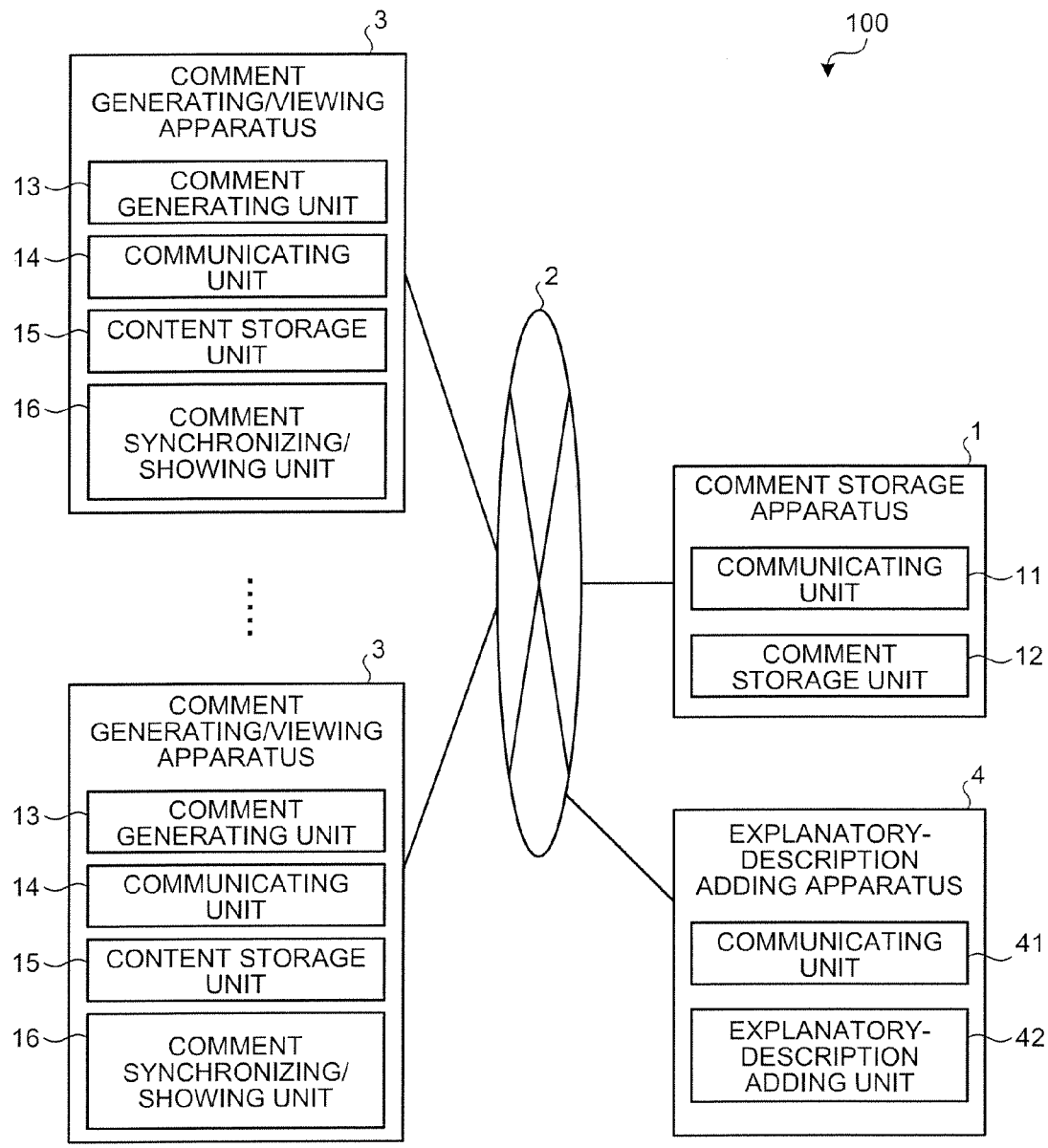
FIG. 3 is a block diagram of a functional configuration of the system.

FIG. 3 is a block diagram of a functional configuration of the comment viewing system 100. As shown in FIG. 3, the comment generating/viewing apparatus 3 includes a comment generating unit 13, a communicating unit 14, a content storage unit 15, and a comment synchronizing/showing unit 16, that are implemented by the comment generating and viewing program. The comment generating unit 13 provides the user with a function of generating comment information having a link to video contents. The communicating unit 14 communicates with the comment storage apparatus 1 and the explanatory-description adding apparatus 4. The content storage unit 15 of the comment generating/viewing apparatus 3 stores video contents information in the HDD 104 that serves as a database. FIG. 4 is a schematic diagram illustrating a data configuration of content information stored in the content storage unit 15. FIG. 4 indicates that for example a video content M1 is a television program having a title of "Roman Holiday". The same content identifier can be used for an original and a rerun of the program, or for a television program and a DVD, as far as the video contents themselves are considered the same. The comment synchronizing/showing unit 16 synchronizes the comment information received by the communicating unit 14 from the comment storage apparatus 1 with video contents, and displays the synchronized data.

The comment storage apparatus 1 has a communicating unit 11 and a comment storage unit 12, that are implemented by the comment storing program. The communicating unit 11 communicates with the comment generating/viewing apparatus 3 and the explanatory-description adding apparatus 4. The comment storage unit 12 stores comment information generated by each of the comment generating/viewing apparatus 3. FIG. 5 is a schematic diagram illustrating a data configuration of the comment information stored in the comment storage unit 12. As shown in FIG. 5, a comment identifier C1 indicates that Mr. A posted a comment that "Under the skirt of her dress, she takes off her shoes and is swinging her legs [M1, 00:04:38]" on a comment storing location B1 at 10:00, Jun. 10, 2001. The scene link of [M1, 00:04:38] included in the text of the comment refers to a scene at a time of 00:04:38 in the video content M1.

The explanatory-description adding apparatus 4 includes a communicating unit 41 and an explanatory-description adding unit 42, that are implemented by the explanatory-description adding program. The communicating unit 41 communicates with the comment storage apparatus 1 and the comment generating/viewing apparatus 3. The explanatory-description adding apparatus 4 adds metadata about what is seen on the scene, in the form of label group for each scene, and adds explanatory descriptions to a scene bookmarked by the user, by using the added label group. More specifically, the explanatory-description adding unit 42 calculates a distance between labels (distance between metadata) in the label group attached to each scene, and selects a combination of labels having the longest distance therebetween as explanatory descriptions, thereby adding easily-comprehensible explanations that distinguish between scenes, to each scene.

The comment generating function of the comment generating/viewing apparatus 3 is explained. The comment generating unit 13 of the comment generating/viewing apparatus 3 displays a screen 50 as shown in FIG. 6 on the display unit 107, to provide the user with a writing user interface (UI) function for writing comments that has a link to video contents.

As shown in FIG. 6, the screen 50 includes a content display unit 51, a content operating unit 52, a text information editing unit 53, a "Transmit" button 54, and an "Insert link" button 55.

The content display unit 51 plays video content data stored by the content storage unit 15 in the HDD 104, and allows the user to view the video contents.

The content operating unit 52 performs an operation such as playing or pausing of video contents and changing of the playing speed, on the content display unit 51.

The text information editing unit 53 allows the user to input text information that is a comment (annotation) to be added to the video content data that are displayed on the content display unit 51, and displays the text information as the comment. The annotation is something like "notes" that are added to the video contents. For example, information like "I was impressed by the scene of the woman crying" is added to the video contents. That is, characters inputted by using the input unit 108 are displayed on the text information editing unit 53. When the input is finally fixed, the "Transmit" button 54 is pressed using the input unit 108 and the like. The inputted character string (comment information) is transferred to the comment storage apparatus 1 together with time information through the network 2.

The "Insert link" button 55 is used to insert a link to a scene in the video contents into text information. More specifically, the user operates the play time of the video contents using the content operating unit 52, displays video contents at a time into which a link to the scene is inserted, and selects the "Insert link" button 55 to insert the link to a scene at a position of a cursor on the text information editing unit 53. The link to a scene is shown as a scene link 60 that is an icon in FIG. 6.

In this case, the scene link 60 is inserted into the text information editing unit 53 by selection of the "Insert link" button 55 by the user. However, the scene link 60 is not limited to this. A scene that is displayed on the content display unit 51 when the user enters the text information can be used for the scene link 60. For example, the user pauses video contents by using the content operating unit 52, and enters text information on the scene by using the input unit 108. In this case, the entered text information is associated with the scene link 60 to the scene to generate a comment. That is, when the user pauses video contents to start entering the text information, the user inserts the scene link 60 to the suspended scene at the top of the text information. In this case, the "Insert link" button 55 is not indispensable.

Figures 7, 8:
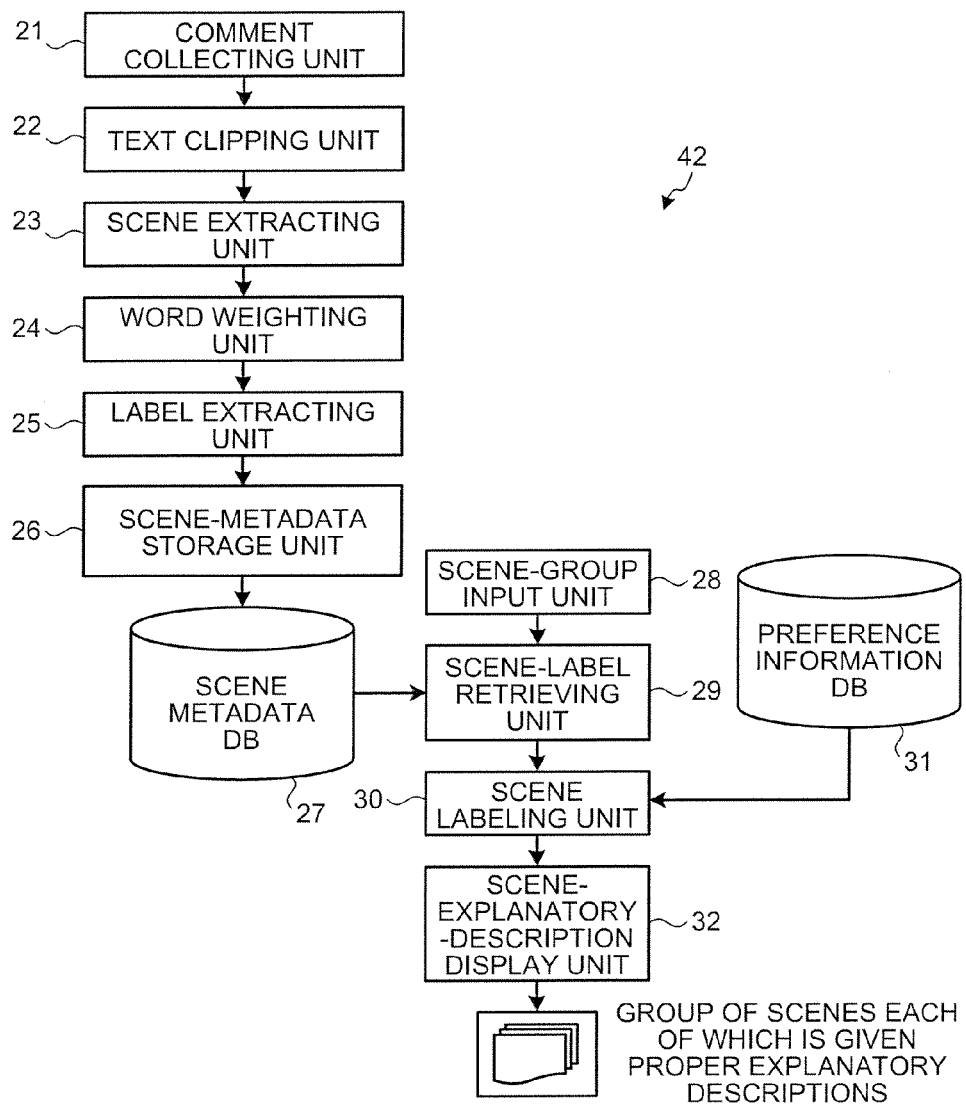
FIG. 7 is a schematic diagram illustrating information included in a scene link.
FIG. 8 is a block diagram of a configuration of an explanatory-description adding unit.

The scene link 60 has a content ID that identifies video contents and time information of a linked scene in the video contents. An exemplary scene link 60 is shown in FIG. 7. As shown in FIG. 7, the scene link 60 includes a content ID 601, a representative time 602, a start time 603, and an end time 604. In this case, the scene link 60 is a link to a scene that starts at 12000 milliseconds from the top of the video content having the content ID 601 of "1234" and ends at 20000 milliseconds from the top, and a representative scene is located at 15000 milliseconds from the top. The representative time 602 of the representative scene can be used for the time of the scene link 60 that is displayed as a thumbnail (image of reduced size) of the scene, instead of an icon.

In the case as shown in FIG. 7, three times of the representative time 602, the start time 603, and the end time 604 are specified. However, theses times can be the same. When these times are the same, the time is used for a time to start the scene in a case as described below that video contents and comments are displayed with being synchronized together. In this case, the scene link 60 can include only one of the representative time 602, the start time 603, and the end time 604.

Exemplary comment information generated as described above has the scene link 60 to the video contents, included in the text information editing unit 53 as shown in FIG. 6. When completing the comment information having a scene link to the video contents, the user selects the "Transmit" button 54 announcing transmission of the comment information by using the input unit 108, and transmits the comment information to the comment storage apparatus 1.

Figures 9, 10:
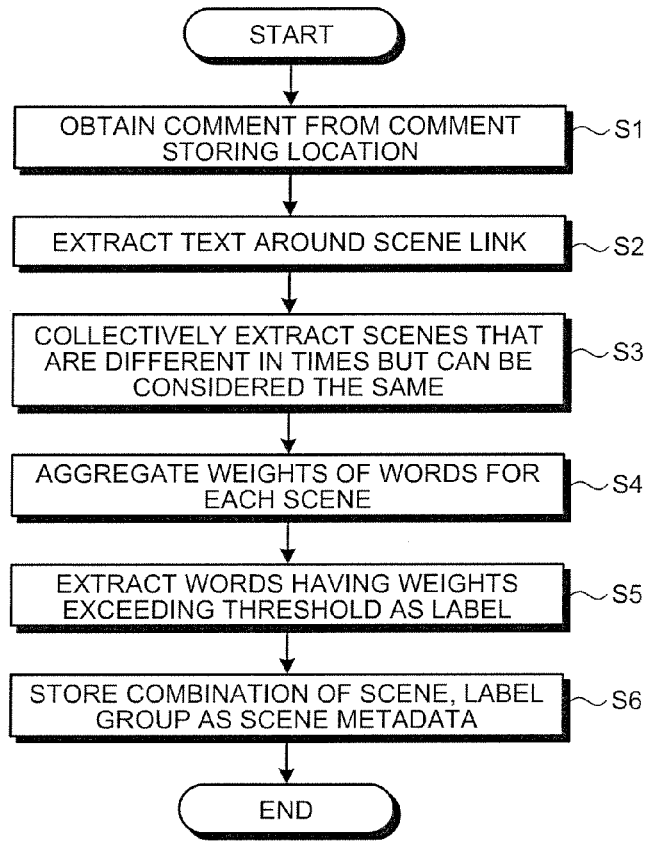
FIG. 9 is a flowchart of a scene-metadata extracting process.
FIG. 10 is a schematic diagram illustrating a data configuration of comment storing location information.

The explanatory-description adding unit 42 of the explanatory-description adding apparatus 4, providing a characteristic function according to the first embodiment, is explained in detail. FIG. 8 is a block diagram of a configuration of the explanatory-description adding unit 42. FIG. 9 is a flowchart of a scene-metadata extracting process in the explanatory-description adding unit 42.

As shown in FIG. 8, the explanatory-description adding unit 42 includes a comment collecting unit 21, a text clipping unit 22, a scene extracting unit 23, a word weighting unit 24, a label extracting unit 25, a scene-metadata storage unit 26, a scene metadata database (DB) 27, a scene-group input unit 28, a scene-label retrieving unit 29, a scene labeling unit 30, a preference information DB 31, and a scene-explanatory-description display unit 32.

Figure 11:
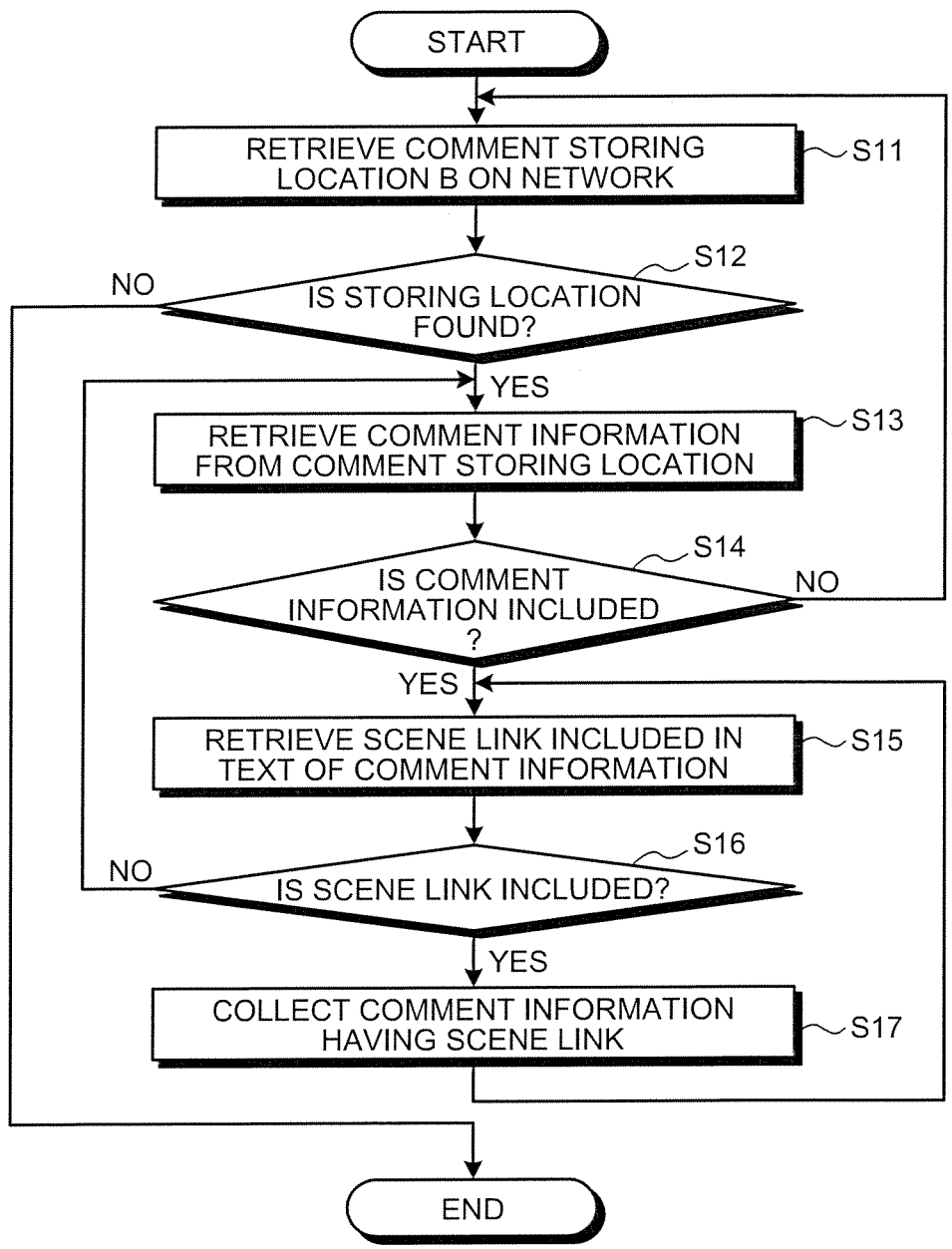
FIG. 11 is a flowchart of a comment collecting process.

The comment collecting unit 21 collects comment information having scene links to video contents (video content IDs and time information) from each of the comment storage apparatus 1 through the network 2 (step S1 in FIG. 9). FIG. 10 is a schematic diagram illustrating a data configuration of comment storing location information. As shown in FIG. 10, a comment storing location B1 has a title of "Bulletin board P", and indicates that comment information can be obtained when a Uniform Resource Locator (URL) of "http://ppp.ppp.ppp.ppp/" is accessed. As shown by the flowchart of FIG. 11, the comment collecting unit 21 searches for the comment storage apparatus 1 as the comment storing location on the network 2 (step S11) and, when the comment storing location is found (YES at step S12), retrieves comment information from the comment storing location (step S13). When the retrieved comment storing location includes comment information (YES at step S14), the comment collecting unit 21 retrieves a scene link included in the text of the comment information (step S15). When any scene link is included (YES at step S16), the comment collecting unit 21 collects comment information having the scene link to video contents (video content ID and time information) (step S17). When the processes at steps S13 to S17 are performed for all comment information in all comment storing locations (NO at step S12), the process ends.

The text clipping unit 22 clips partial text information around all scene links included in the collected comments having scene links to video contents (step S2 in FIG. 9). To clip text information around the scene links, various methods are adopted including a method of simply clipping n words before and after a scene link, and a method of clipping a sentence that includes a scene link. For example, when text information " . . . under the skirt of her dress, she takes off her shoes and is swinging her legs." is located before a scene link, the words "and is swinging her legs" are clipped according to the method of simply clipping five words before and after a scene link.

The scene extracting unit 23 collectively extracts scenes that are physically different but can be considered logically the same, as the same scenes (step S3 in FIG. 9). Identification of scenes by the scene extracting unit 23 can be made using a difference in times or using the similarity of the word groups included in the clipped partial text information.

The word weighting unit 24 performs morphological analysis or semantic class analysis on the partial text information associated with the scenes extracted together by the scene extracting unit 23, to aggregate the weights of words for each scene (step S4 in FIG. 4). The weighting of words by the word weighting unit 24 can be calculated simply based on the frequency of occurrence or can be previously set according to the word class or semantic class of the word. When a word co-occurs with another word occurring in the scene or is used to describe the scene like "a scene of oo", the weighting can be amended. Synonymous words can be considered collectively.

Figures 12, 13:
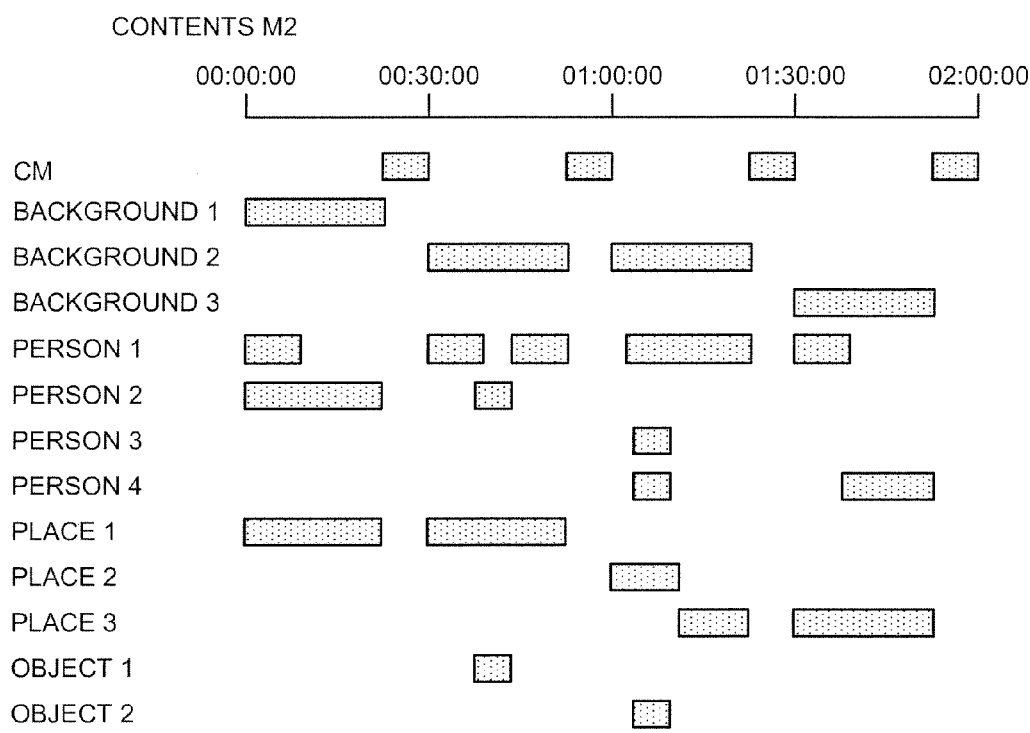
FIG. 12 is a schematic diagram illustrating word information of each scene.
FIG. 13 is a schematic diagram illustrating scene metadata.

FIG. 12 is a schematic diagram illustrating exemplary word information of each scene. As shown in FIG. 12, the frequency of occurrence of a word and the word weight are associated with word information of each scene to which a scene identifier is assigned. In the case shown in FIG. 12, the word class is associated with the word information of each scene.

The label extracting unit 25 extracts words having the weights exceeding a previously-set threshold value, which are aggregated by the word weighting unit 24 for each scene, as labels of the scene (step S5 in FIG. 9). For example, when a threshold value "3.0" is set for the exemplary word information of each scene shown in FIG. 12, "Ann" and "shoes" are the labels of the scene S1.

The scene-metadata storage unit 26 stores a combination of the scene and the label group, extracted by the label extracting unit 25, in the scene metadata DB 27 as scene metadata (step S6 in FIG. 9).

FIG. 13 is a schematic diagram illustrating exemplary scene metadata. FIG. 13 depicts exemplary scene metadata that is added to a video content M2. For example when the label of "Person 1" is "Ann", scenes S1, S2, S3, . . . , as shown in FIG. 12 are extracted. As shown in FIG. 13, each scene is generally not a point but a section having a width. In the case shown in FIG. 13, words as the noun are classified into a background, a person, a place, and an object. Depending on viewpoints for scenes that are treated, such as what is seen in the scene is a person or a place, plural labels can be usually assigned to one and the same time.

An explanatory-description adding process of adding explanatory descriptions to a scene bookmarked by the user, using the scene metadata (combination of scene and label group) is explained with reference to a flowchart of FIG. 14.

Figure 14:
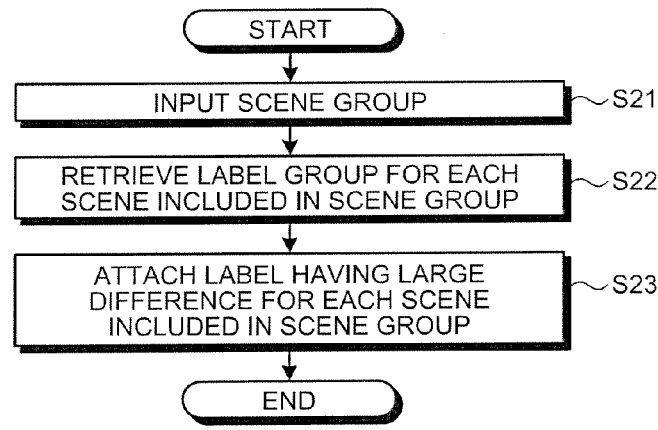
FIG. 14 is a flowchart of an explanatory-description adding process.

The scene-group input unit 28 receives, from the comment generating/viewing apparatus 3, input of a scene group to which explanatory descriptions are to be added (step S21 in FIG. 14).

When given the scene group to which explanatory descriptions are to be added, the scene-label retrieving unit 29 retrieves a label group corresponding to a scene included in the scene group, from the scene metadata DB 27 (step S22 in FIG. 14).

Figure 15:
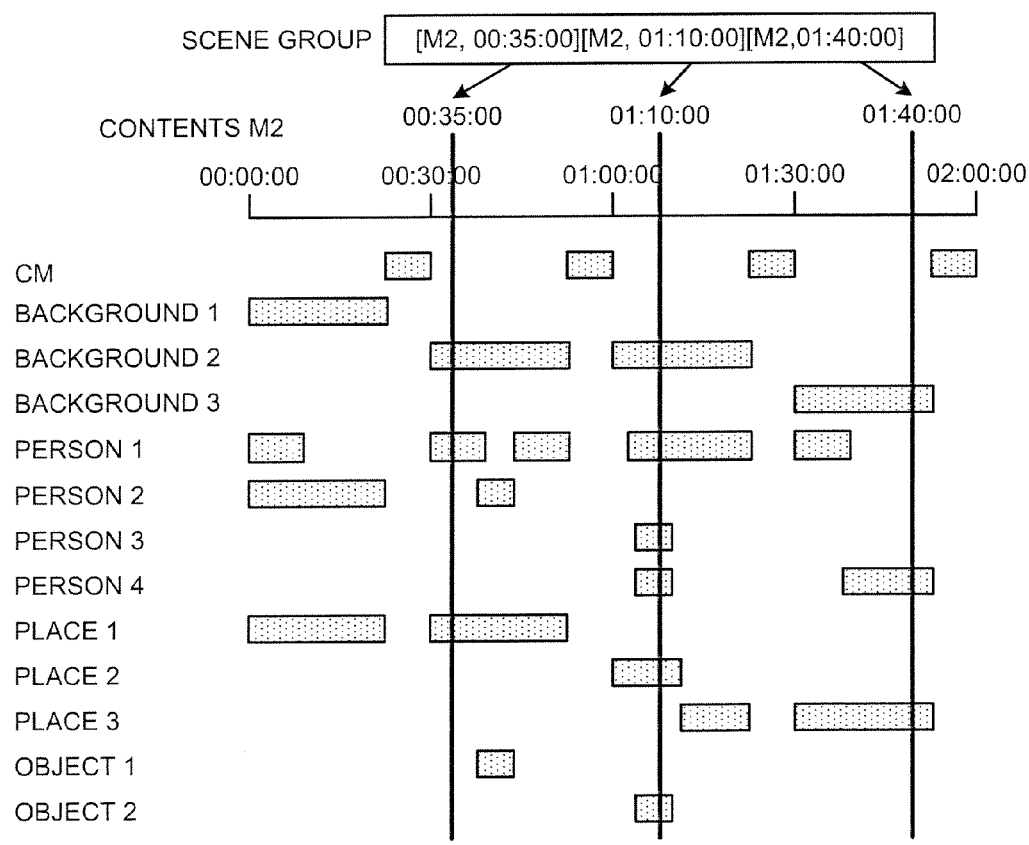
FIG. 15 is a schematic diagram illustrating a label group retrieved from the scene metadata of FIG. 13.

FIG. 15 is a schematic diagram illustrating an exemplary label group retrieved from the scene metadata as shown in FIG. 13. FIG. 15 depicts a case that when scene metadata as shown in FIG. 13 is stored in the scene metadata DB 27, [M2, 00:35:00], [M2, 01:10:00], and [M2, 01:40:00] are given as the scene group to which explanatory descriptions are to be added. As shown in FIG. 15, a label group of [Background 2, Person 1, Place 1] is retrieved from a scene at a time of 00:35:00 in the video content M2, and a label group of [Background 2, Person 1, Person 3, Person 4, Place 2, Object 2] is retrieved from a scene at a time of 01:10:00.

The scene labeling unit 30 selects a label having a large difference for each scene included in the scene group based on the combination of scene and label group retrieved by the scene-label retrieving unit 29, and attaches the selected label to each scene (step S23 in FIG. 14). In this case, the distance between labels is calculated by various methods including a method of calculating the distance based on sorting classes of labels such as the word class and the semantic class, and a method of using preference information of the user. An exemplary scene labeling process using the sorting class of the label and the user's preference information stored in the preference information DB 31 is explained below.

FIG. 16 is a flowchart of a scene labeling process in the scene labeling unit 30. As shown in FIG. 16, in the scene labeling process, a table X including combinations of scene, sorting class, and label, is first initialized based on the scenes and the label groups (step S31). This table X is used later as input for selecting a label that is added as explanatory descriptions for a scene.

The scene labeling unit 30 obtains one combination of a scene and a label group, retrieved by the scene-label retrieving unit 29, determines to which sorting class the labels included in the label group belong, and adds a combination of the scene, the sorting class, and the label to the table X (step S32). For example, in the case of the combinations of scenes and label groups as shown in FIG. 15, since the respective labels belong to the sorting classes of "Background", "Person", "Place", and "Object", the table X as shown in FIG. 17 is obtained.

The scene labeling unit 30 deletes labels appearing in all scenes from the table X to select a combination having as large a distance as possible between labels (step S33). Because the table as shown in FIG. 17 does not have a label appearing in all scenes, no label is deleted.

When the scene group to which explanatory descriptions are to be added is a scene link included in comments, the scene link sometimes describes of "what" scene the scene group is, to some extent. Also in such a case, a label corresponding to "what" is deleted from the table X. For example, as shown in FIG. 18, when the user can determine that scenes of "smile" of "Princess Ann" are collected, labels of "Princess Ann" and "smile" can be deleted from the table X because it is apparent that these labels are attached to each scene.

When the table X becomes empty according to the process at step S33 (YES at step S34), it indicates that the table X includes no label to be attached as explanatory descriptions even thought scene groups to which explanatory descriptions are to be added remain. Accordingly, when the table X becomes empty (YES at step S34), the remaining scenes are considered to have no difference, and sequential numbers such as "Scene 1" and "Scene 2" can be assigned to these scenes. When there is a characteristic scene before or after the remaining scenes, the temporal relationship with this characteristic scene can be used to add time-series descriptions like "5 minutes before the scene of oo" or "3 minutes after the scene of xx" to the remaining scenes.

When the table X is not empty after the process at step S33 (No at step S34), one sorting class C associated with the largest number of scenes in the table X is selected (step S35). When there are plural sorting classes C associated with the largest number of scenes, one of the sorting classes C can be selected randomly, or using the number of labels included in the sorting class, the width of a scene associated with the label, or the weight of the label. Ordering of the sorting classes that is previously set can be alternatively utilized. For example, a method can be adopted of giving priority to a person over an object in the ordering of the sorting classes because a person is considered to have more information that can be seen in the scene than an object. When the user's preference information is stored in the preference information DB 31, the preference information can be used. For example, when it is known that a user pays more attention to places than persons, priority is given to places over persons in ordering of the sorting classes. A method of preferentially utilizing the sorting class or the label that the user selected last time can be alternatively adopted. In the case of the table X as shown in FIG. 17, the sorting classes associated with all scenes are "Background", "Person", and "Place", and objects are not associated with all scenes. Therefore, any one of "Background", "Person", and "Place" is selected. While the sorting classes such as "Person" are set for the table X as shown in FIG. 17, more specific sorting classes such as "Actor", "Actress", "Presenter", and "Mr. So-and-so" can be set. In this case, when it is known that a user is interested only in actresses, differences in all scenes are represented by differences in actresses.

At step S36, one label L that is associated with the smallest number of scenes in the sorting class C selected at step S35 is selected. When there are plural labels associated with the smallest number of scenes in the selected sorting class C, one label L can be selected randomly. The label L can be selected using the width of a scene with which the label is associated, or the weight of the label.

When the label L identifies only one scene S (YES at step S37), the scene S can be identified by the label L. Thus, the label L is attached as explanatory descriptions of the scene S, and the scene S and the label L are deleted from the table X (step S38).

When the table X is not empty (NO at step S39), the process returns to step S35 to select one sorting class C associated with the largest number of scenes, from the table X. In this way, scene explanatory descriptions can be added to the remaining scenes. For example, in the case of the table X shown in FIG. 17, three kinds of labels are attached to different scenes, respectively, in the sorting class of "Place". Therefore, these three labels are attached as the explanatory descriptions to distinguish among "Scene at Place 1", "Scene at Place 2", and "Scene at Place 3".

When the table X is empty (YES at step S39), the scene labeling process ends.

When the label L is associated with the scene group Ss (NO at step S37), the label L cannot identify scenes included in the scene group Ss. Therefore, one sorting class C' that is different from the sorting class C previously selected, associated with the largest number of scenes in the scene group Ss is selected (step S40), and the process returns to step S37. This process is repeatedly performed to add scene explanatory descriptions to the scenes included in the scene group Ss.

The scene-explanatory-description display unit 32 is explained. The scene-explanatory-description display unit 32 presents a label L to be attached as the explanatory descriptions of the scene S through a UI.

Figure 19:
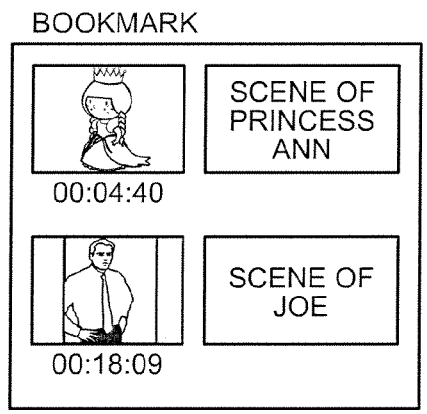
FIG. 19 is a front view of a screen in a case that bookmarked scenes having explanatory descriptions added thereto are presented.

FIG. 19 is a front view of a screen presented with explanatory descriptions being added to bookmarked scenes. As shown in FIG. 19, when the bookmarked scenes are presented with scene explanatory descriptions being added thereto in addition to time information or thumbnail images, the user can determine based on which difference each scene is bookmarked. In the case as shown in FIG. 19, a "scene of Princess Ann" and a "scene of Joe" in the video content M1 (Roman Holiday) are bookmarked.

Figure 20:
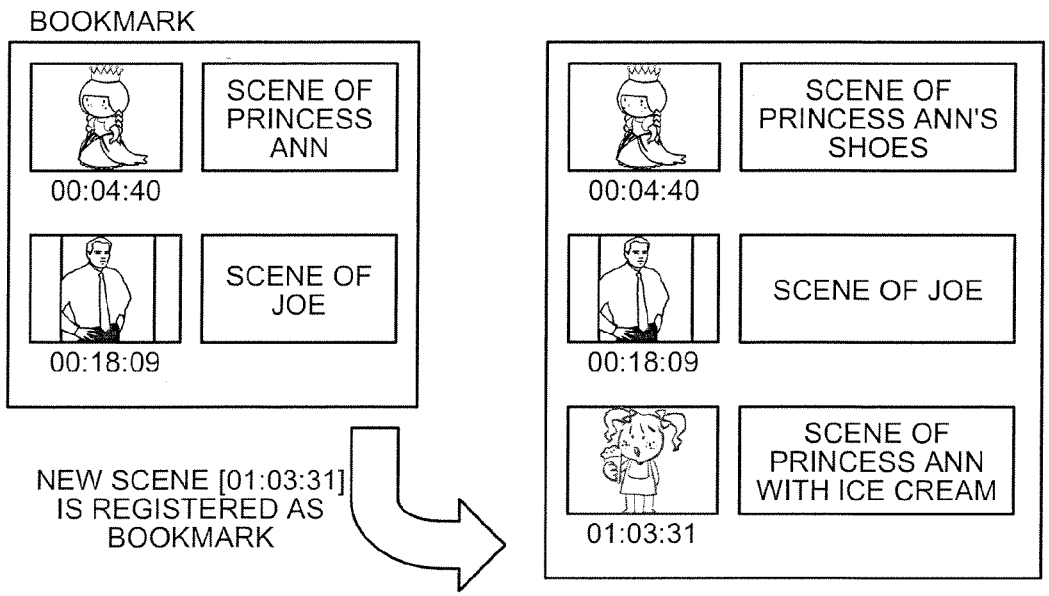
FIG. 20 is a front view of a screen in a case that another scene is newly bookmarked.

FIG. 20 depicts a case that a scene of [M1, 01:03:31] is newly bookmarked, in addition to the two bookmarked scenes shown in FIG. 19. As shown in FIG. 20, when a new scene is bookmarked, descriptions are displayed to explain a new difference to distinguish among these scenes. Correspondingly, the explanatory descriptions of the scenes already bookmarked are also changed properly to give more detailed explanations. For example, in the case as shown in FIG. 20, the newly bookmarked scene is also a scene relating to "Princess Ann". Therefore, the explanatory descriptions of the scene of [M1, 00:40:40], to which an explanation of "Scene of Princess Ann" is previously added, are modified to a more detailed explanation of "Scene of shoes of Princess Ann". Each time an additional scene is bookmarked, more detailed explanations of each scene are presented.

The table X generated as described above, that contains association of scenes bookmarked by the user and explanatory descriptions as metadata for the corresponding scenes, is transmitted to the comment storage apparatus 1 and the comment generating/viewing apparatus 3.

Figure 21:
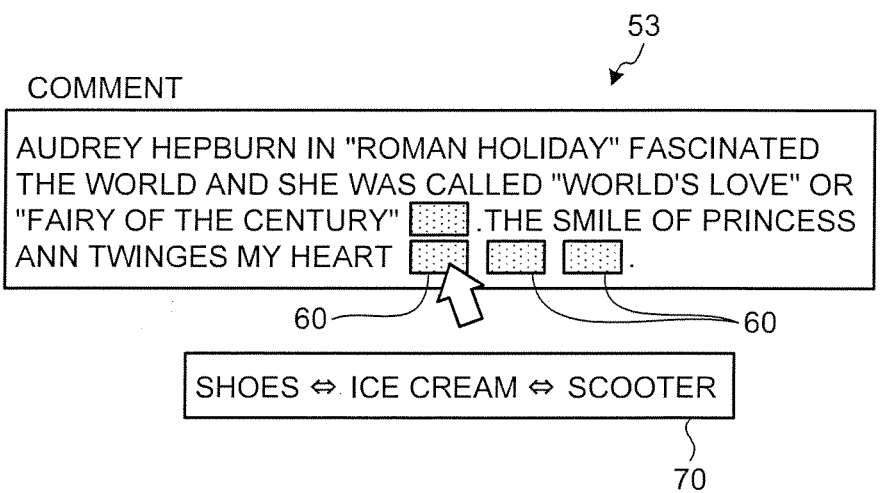
FIG. 21 is a schematic diagram for explaining a specific example of a specific process of displaying explanatory descriptions.
Figure 22:
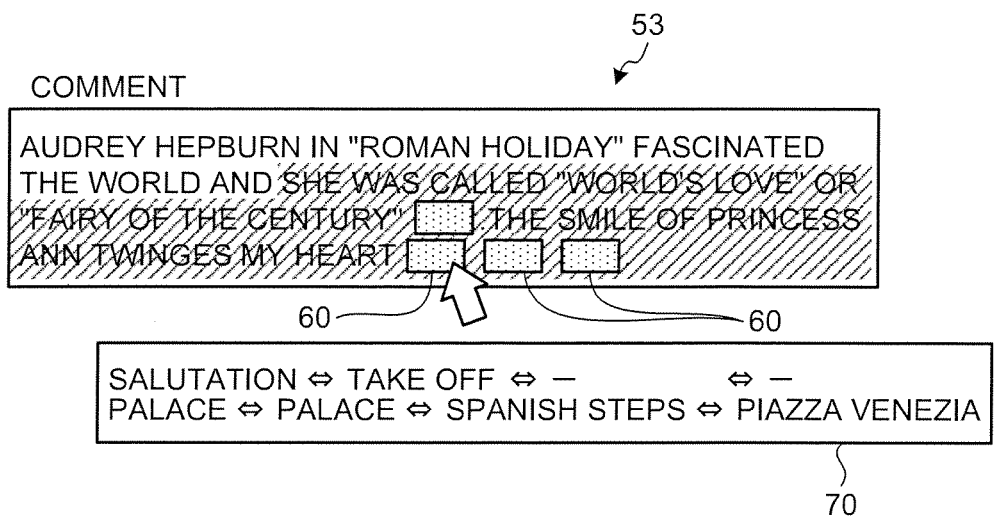
FIG. 22 is a schematic diagram for explaining another specific example of a specific process of displaying explanatory descriptions.

A specific-explanatory-description display process of by the comment generating/viewing apparatus 3 is explained with reference to a specific example. FIG. 21 depicts an operation in the case that when the user reads comments in which plural scene links are embedded in the text information editing unit 53 on the screen 50 displayed by the display unit 107 in the comment generating/viewing apparatus 3, a pointer of a mouse (input unit 108) is placed on the scene link 60 that is displayed as an icon. In this case, a scene group to which explanatory descriptions are to be added is transmitted from the comment generating/viewing apparatus 3 to the explanatory-description adding apparatus 4. The explanatory-description adding unit 42 in the explanatory-description adding apparatus 4 generates the table X that contains associations between bookmarked scenes and explanatory descriptions. The explanatory-description adding unit 42 then presents the explanatory descriptions to the comment generating/viewing apparatus 3 through the UI. More specifically, when explanatory descriptions 70 that are associated with the selected scene link 60 in the table X generated by the explanatory-description adding apparatus 4 are displayed in a pop-up window near the selected scene link 60, as shown in FIG. 21, the user can determine based on what difference the respective scenes are linked. When part or all of the comment texts are selected as shown in FIG. 22, the explanatory descriptions 70 of the scene link 60 included in the selected portion are displayed in a pop-up window. Accordingly, the user can determine based on what difference the respective scenes are linked.

According to the first embodiment, when a scene group including plural scenes, for example a group of scenes bookmarked during viewing of video contents is inputted, a combination of a scene in the scene group and metadata corresponding to the scene, that represents characteristics of the scene in a group of the metadata, having a largest distance between the metadata is selected as explanatory descriptions that are explanations to distinguish among the respective scenes, and the explanatory descriptions selected for each scene included in the scene group are added to each scene. Accordingly, the explanatory descriptions that enable to distinguish among the scenes can be added to each scene. Therefore, posting of impressions or opinions on a scene bookmarked during viewing can be facilitated. In addition, the posted text and video contents are synchronized to enhance readability, which activates communication via video contents.

According to the first embodiment, metadata representing characteristics of a scene in video contents (metadata indicating what is seen in the scene) can be extracted in the form of label group for each scene, from texts around a scene link (link that is embedded to refer to the scene) in the comment information.

A second embodiment of the present invention is explained next with reference to FIGS. 23 and 24. The same parts as those in the first embodiment are denoted by like reference numerals or letters, and redundant explanations thereof will be omitted.

The first embodiment assumes the case that combinations of scene and text are collected in the state where the explanatory-description adding apparatus 4 is connected to the comment storage apparatus 1 and the comment generating/viewing apparatus 3 through a network, while the second embodiment assumes a case that combinations of scene and text are collected from closed caption or an electronic program guide (EPG).

Figure 23:
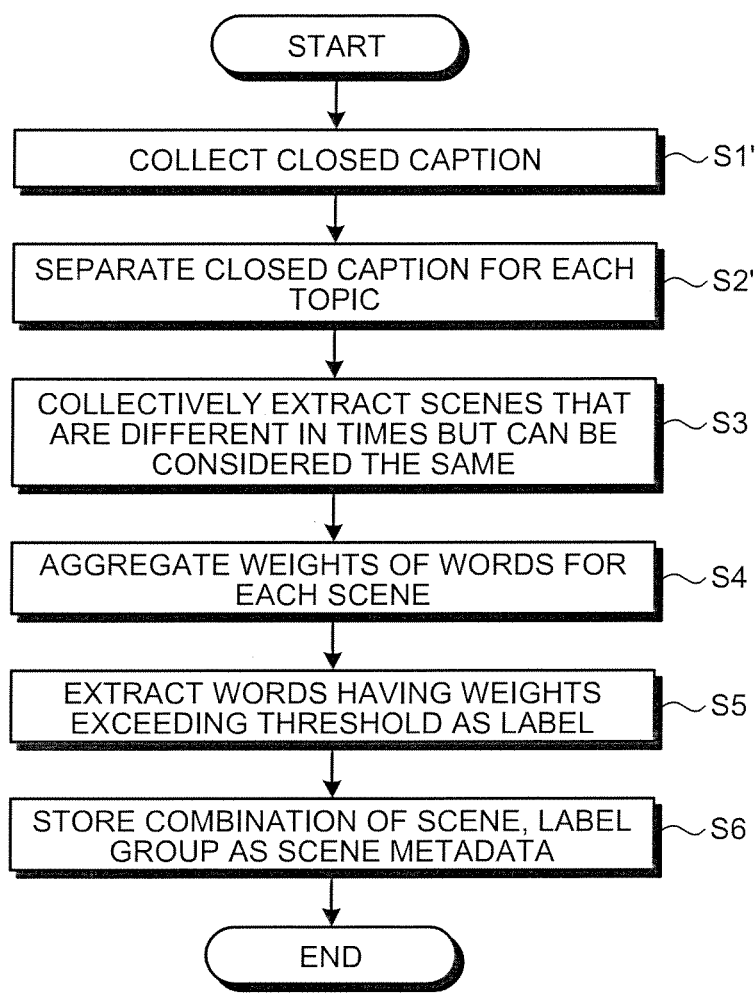
FIG. 23 is a flowchart of a scene-metadata extracting process according to a second embodiment of the present invention.

FIG. 23 is a flowchart of a scene-metadata extracting process in the explanatory-description adding unit 42 according to the second embodiment. As shown in FIG. 23, the comment collecting unit 21 collects closed caption information that is transmitted through broadcast waves together with video contents (step S1'). FIG. 24 is a schematic diagram illustrating a data configuration of the closed caption information. As shown in FIG. 24, the closed caption information includes captions that are managed according to the time.

The text clipping unit 22 clips text information included in the collected closed caption information (step S2'). More specifically, the text clipping unit 22 detects a point at which scenes or topics are switched, using a topic separating technology, to clip combinations of scene and text. For example, the closed captions of a scene of the Mouth of Truth in Roman Holiday are shown in FIG. 24. A section including lines of Princess Ann is clipped as "Scene of Princess Ann", and a section including lines of Joe is clipped as "Scene of Joe".

Because the processes at step S3 and following steps are the same as in the first embodiment, redundant explanations thereof will be omitted.

According to the second embodiment, metadata representing characteristics of a scene in video contents (metadata indicating what is seen in the scene) can be extracted from the closed caption or the EPG, in the form of label group for each scene.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An explanatory-description adding apparatus comprising:
   a collecting unit that collects the certain time associated with the scene and text information associated with the scene at the certain time;

a clipping unit that clips partial text information from the text information collected by the collecting unit;

an extracting unit that collectively extracts a plurality of scenes that are physically different but logically the same from among the collected scenes, as the same scenes;

a weighting unit that analyzes the partial text information associated with the scenes that are collectively extracted by the extracting unit as the same scenes, and weights word information included in the partial text information for each of the scenes;

an extracting unit that extracts the word information exceeding a predetermined threshold value, as the metadata of the scene associated with the word information;

a storage unit that stores scene metadata as combinations of the scene at the certain time in video contents and a group of metadata representing characteristics of the scene;

an input unit that inputs a scene group including a plurality of the scenes;

a retrieving unit that retrieves a group of metadata corresponding to the respective scenes included in the scene group, from the scene metadata; and an adding unit that selects combinations of the metadata having a difference by deleting metadata appearing in all scenes of the scene group such that a distance among the metadata is a maximum for the scenes included in the scene group, based on a combination of the scene and the metadata retrieved by the retrieving unit, and adds the metadata to the scenes of the scene group, as explanatory descriptions, wherein, when the deleting of the metadata appearing in all scenes of the scene group deletes all of the metadata for a first scene in the scene group and a second scene in the scene group has remaining metadata, the adding unit adds metadata for the first scene as a time-series description using a temporal relationship with the second scene.

2. The apparatus according to claim 1, wherein the text information collected by the collecting unit is comment information that includes text information associated with the scene at the certain time in the video contents, stored in a comment storage apparatus through a network.

3. The apparatus according to claim 1, wherein the text information collected by the collecting unit is closed caption that is text information associated with the scene at the certain time in the video contents.

4. The apparatus according to claim 1, wherein the text information collected by the collecting unit is an electronic program guide (EPG) that is text information associated with the scene at the certain time in the video contents.

5. The apparatus according to claim 1, wherein the adding unit calculates a distance between the metadata according to previously-ordered sorting classes of the metadata.

6. The apparatus according to claim 1, wherein the adding unit calculates a distance between the metadata according to sorting classes of the metadata that are previously ordered based on user's preference.

7. The apparatus according to claim 1, wherein the adding unit calculates a distance between the metadata included in the group of the metadata corresponding to the scenes included in the scene group, and selects one of the combinations having the largest distance between the metadata, as explanatory descriptions.

8. A non-transitory computer readable medium including programmed instructions for adding explanatory descriptions as explanations to distinguish among scenes, wherein the instructions, when executed by a computer, cause the computer to perform:

collecting the certain time associated with the scene and text information associated with the scene at the certain time;

clipping partial text information from the text information collected in the collecting;

collectively extracting a plurality of scenes that are physically different but logically the same from among the collected scenes, as the same scenes;

analyzing the partial text information associated with the scenes that are collectively extracted in the extracting as the same scenes, and weighting word information included in the partial text information for each of the scenes;

extracting the word information exceeding a predetermined threshold value, as the metadata of the scene associated with the word information;

storing scene metadata as combinations of the scene at the certain time in video contents and a group of metadata representing characteristics of the scene, in a storage unit;

inputting a scene group including a plurality of the scenes that are received through an input unit;

retrieving a group of metadata corresponding to the respective scenes included in the scene group, from the scene metadata stored in the storage unit; and selecting combinations of the metadata having a difference by deleting metadata appearing in all scenes of the scene group such that a distance among the metadata is a maximum for every scene of the scene group based on a combination of the scene and the metadata retrieved, and adding the metadata to the scenes of the scene group, as explanatory descriptions, wherein, when the deleting of the metadata appearing in all scenes of the scene group deletes all of the metadata for a first scene in the scene group and a second scene in the scene group has remaining metadata, the adding includes adding metadata for the first scene as a time-series description using a temporal relationship with the second scene.

9. An explanatory-description adding method executed by a computer, comprising:

collecting the certain time associated with the scene and text information associated with the scene at the certain time;

clipping partial text information from the text information collected in the collecting;

collectively extracting a plurality of scenes that are physically different but logically the same from among the collected scenes, as the same scenes;

analyzing the partial text information associated with the scenes that are collectively extracted in the extracting as the same scenes, and weighting word information included in the partial text information for each of the scenes;

extracting the word information exceeding a predetermined threshold value, as the metadata of the scene associated with the word information;

storing, by the computer, scene metadata as combinations of the scene at the certain time in video contents and a group of metadata representing characteristics of the scene, in a storage unit;

inputting a scene group including a plurality of the scenes that are received through an input unit;

retrieving a group of metadata corresponding to the respective scenes included in the scene group, from the scene metadata stored in the storage unit; and selecting combinations of the metadata having a difference by deleting metadata appearing in all scenes of the scene group such that a distance among the metadata is a maximum for every scene of the scene group, based on a combination of the scene and the metadata retrieved, and adding the metadata to the scenes of the scene group, as explanatory descriptions, wherein, when the deleting of the metadata appearing in all scenes of the scene group deletes all of the metadata for a first scene in the scene group and a second scene in the scene group has remaining metadata, the adding includes adding metadata for the first scene as a time-series description using a temporal relationship with the second scene.

* * * * *